US008820313B1

(12) United States Patent
Lutes

(10) Patent No.: US 8,820,313 B1
(45) Date of Patent: Sep. 2, 2014

(54) TRANSPORTABLE KITCHEN

(76) Inventor: Eugene Lutes, Massillon, OH (US)

( * ) Notice: Subject to any disclaimer, the term of this patent is extended or adjusted under 35 U.S.C. 154(b) by 1029 days.

(21) Appl. No.: 12/776,559

(22) Filed: May 10, 2010

(51) Int. Cl.
F24C 1/16 (2006.01)

(52) U.S. Cl.
USPC ........ 126/276; 126/268; 126/41 R; 126/25 R; 296/22

(58) Field of Classification Search
USPC .................. 296/22; 126/276, 41 R, 268, 25 R
See application file for complete search history.

(56) References Cited

U.S. PATENT DOCUMENTS

| | | | | |
|---|---|---|---|---|
| 3,940,175 | A | * | 2/1976 | Robison .......................... 296/22 |
| 4,511,174 | A | * | 4/1985 | Walker .......................... 296/173 |
| 4,601,509 | A | * | 7/1986 | Ellis, Sr. .......................... 296/22 |
| 4,632,836 | A | * | 12/1986 | Abbott et al. .................. 426/302 |
| 4,919,477 | A | * | 4/1990 | Bingham et al. ........... 296/24.36 |
| 5,787,719 | A | * | 8/1998 | Wilson ............................. 62/236 |
| 5,857,741 | A | | 1/1999 | Anderson |
| 6,189,944 | B1 | * | 2/2001 | Piche .............................. 296/22 |
| 6,416,101 | B1 | | 7/2002 | Bartch |
| 6,557,547 | B1 | * | 5/2003 | MacIntosh .................. 126/41 R |
| 7,008,230 | B2 | * | 3/2006 | Hoglund ....................... 434/236 |

* cited by examiner

Primary Examiner — Avinash Savani
(74) Attorney, Agent, or Firm — John D. Gugliotta

(57) ABSTRACT

The present invention relates generally to a trailer that can be stored compactly for transport to and from tailgating events. The custom tailgating and team entertainment trailer can be transported to a sporting event where tailgating is promoted, or hauled behind the family car to a children's team event. The customized trailer is formed from a steel frame shaped similar to a conventional 4×6 utility trailer upon which various kitchen equipment and appliance are supported and provides a 2000 pound gross vehicle weight rating for easy mobility and towing from a standard 1⅞" hitch ball. A flat upper panel encloses the equipment when stored, and provides a horizontal support surface when deployed. A event grill is rollably deployed from behind a door on the trailers first side and, when extended, provides a five foot wide, four burner grilling surface provided with cooking fuel from pair of LP propane tanks mounted to a tank rack positioned for easy accessability and control at the trailer's front end. The rear of the trailer supports a double rear access door to allow for access and egress to the substantial enclosed storage area within, including a roll-out shelf for supporting ample other portable equipment, and a bin storage door mounted the trailers second side provides access to a rolling, two tier wire pull drawer for additional food storage adjacent to a prep tray door from which can be deployed a stainless steel, slide out preparation table.

3 Claims, 11 Drawing Sheets

TRANSPORTABLE KITCHEN

RELATED APPLICATIONS

Not Applicable

BACKGROUND OF THE INVENTION

1. Field of the Invention

The present invention relates generally to a transportable picnic kitchen device and, more particularly, to a trailer mounted transportable kitchen appliances mounted to and retracted within a tow-able trailer for deployment of cooking facilities in a remote area.

2. Description of the Related Art

An activity known as "tailgate parties" has become commonplace at a variety of sporting events. In a tailgate party, sports fans and spectators gather in parking lots and along roadsides to eat, drink and socialize prior to a sporting event. Tailgate parties have become popular in the United States as social gatherings events that take place in stadium parking lots before football games. The use of the tailgate party has spread to the pre-game festivities at sporting events of all kinds (e.g. football, basketball and baseball) and is also used at non-sporting events such as weddings and other non-sports-related barbecue gatherings. The previously underground subculture is now a part of the mainstream and has become typical and widespread. However, with its popularity has come an identification of various challenges to supporting such an event. Tailgate parties typically occur in the parking lots of sports arenas where no food service equipment is available. Sports fans and spectators often bring food and beverages, but this can be limited to pre-made or ready-to-each picnic fare due to the absence of cooking appliances, running water, and the like. Tailgate parties normally take place in or around the vehicles of the participants. Some sports fans bring portable picnic tables and chairs in their vehicles to use at the parties, while others simply sit on their vehicles. It is also common for picnics similar to tailgate parties to be enjoyed in various remote areas, such as in parking lots of amusement parks, national forests, public picnic grounds, roadside parks, and the like.

Table and chair assemblies have been developed specifically for use at tailgate parties, picnics and the like. A typical tailgate table and chair assembly is disclosed, for example, in U.S. Pat. No. 5,857,741 issued to Thomas J. Anderson ("the '741 patent"). The '741 patent provides a vehicle-mounted table and chair assembly that mounts to the towing hitch of a vehicle and forms a table and seating device suitable for tailgate parties, camping, and the like. However, the table and chair assembly disclosed in the '741 patent suffers from a number of disadvantages. For example, the table and chair assembly of the '741 patent seats only two people, extends rearwardly from the vehicle a great distance, is difficult and cumbersome to place in a retracted or stowed position for transport, places a great deal of stress on the vehicle hitch during use, and is relatively uncomfortable to sit at due to its lack of foot room. While attending group gatherings such as sporting events, picnics, and children's sporting events such as Little League games, to enhance the enjoyment of the event, it has become commonplace to bring food and beverages in one's vehicle to consume once the vehicle has been parked at the group gathering. These types of group gatherings at sporting events are often referred to as "tailgate parties." Often, people gather around a hatchback portion of a typical vehicle (often a large passenger-style car such as a sport-utility vehicle or a minivan) or the bed of a truck and consume the food and beverages. The food and beverages are typically packed in foam or other insulated coolers. In the case of food and beverages which are desired to be kept cold, the food and beverages are packed in a cooler and typically surrounded with ice. In the case of food and beverages which are desired to be kept warm, the food and beverages are packed in a cooler after typically having been pre-cooked and packed in the cooler while still warm. In the case of food and beverages which are desired to be cooked at the group gathering site, the food is typically packed in a cooler with ice, and the attendees of the party often assemble a gas or charcoal grill adjacent to the vehicle after arriving at the site and cook the food thereon.

Food preparation and serving for these types of group gatherings is often difficult because of the outdoor location of the event and the portability required of the equipment, and it can be even more difficult than at home cooking to keep the food and beverages at a desired serving temperature. For example, if some of the food and beverages are needed to be kept at one temperature (such as a warm temperature) and other of the food and beverages are needed to be kept at another temperature (such as a cold temperature), the packing, assembly and transport of the food and beverages can be even more difficult. In addition, if any of the food needs to be cooked at the gathering site, the attendees must also bring a grill and an appropriate fuel source (such as charcoal). The number of coolers for warm food and beverages, coolers for cold food and beverages, coolers for food that needs to be kept cold prior to cooking, and a grill can require a substantial amount of space in the vehicle is well as substantial inconvenience in packing the vehicle and unpacking the vehicle at the gathering site.

In spite of these ad hoc developments, however, the prior art still falls short of providing a full-service kitchen appliances that are transportable. Consequently, a substantially need for the present invention has been found.

SUMMARY OF THE INVENTION

It is an object of the present invention to provide an improved portable trailer that is specifically adapted for use in supporting tailgaiting activities.

It is another object of the present invention to provide a device that rollably supports a cooking grill and food storage.

It is yet another object of the present invention to provide such a trailer that can be stored compactly for transport to and from tailgating events.

Briefly described according to the preferred embodiment of the present invention, a custom tailgating and team entertainment trailer is provided that can be transported to a sporting event where tailgating is promoted, or hauled behind the family car to a children's team event. The customized trailer is formed from a steel frame shaped similar to a conventional 4×6 utility trailer upon which various kitchen equipment and appliance are supported and provides a 2000 pound gross vehicle weight rating for easy mobility and towing from a standard 1⅞" hitch ball. A flat upper panel encloses the equipment when stored, and provides a horizontal support surface when deployed. A event grill is rollably deployed from behind a door on the trailer's first side and, when extended, provides a five foot wide, four burner grilling surface provided with cooking fuel from pair of LP propane tanks mounted to a tank rack positioned for easy accessability and control at the trailer's front end. The rear of the trailer supports a 25"×44" double rear access door to allow for access and egress to the substantial enclosed storage area within, including a roll-out shelf for supporting both a 16 quart cooler and 48 quart cooler of standard design as well as (4) folding canvas chairs and a 30"×72" folding table. A 15"×24" bin storage door mounted the trailers second side provides access to a rolling, two tier wire pull drawer for additional food storage adjacent to a 5"×39" prep tray door from which can be deployed a stainless steel, slide out preparation table.

It is an advantage of the present invention to provide a stainless steel prep tray, four burner propane event grill, and slide out bin storage on a hitched steel framed pull behind trailer that can be legally towed by almost any automobile.

It is another advantage of the present invention to provide a 10-gallon water tank that is internally protected and accessed by an exterior locking water fill and spout.

It is yet another advantage of the present invention to provide storage and transport for a 16 quart cooler, a 48 quart cooler, a 10'×10' pop-up gazebo, (4) folding canvas chairs and a 30"×72" folding table, all within a transportable, weather resistant enclosure of minimal form factor and volume.

Finally, the tailgating and team entertainment trailer of the present invention can be customized in style with high gloss gel coat, aluminum polished diamond plate trim, aluminum polished diamond plate stone guard, and aluminum polished diamond plate fenders.

The present invention can also be used for team events, picnics, company functions, or similar events in a manner that provides all of the advantages that the foregoing objects entail by means of deployable kitchen appliances from a transportable trailer housing.

BRIEF DESCRIPTION OF THE DRAWINGS

The advantages and the features of the present invention will become better understood with reference to the following and the more detailed description and the claims taken in conjunction with the accompanying drawings, in which like elements are identified with like symbols, and in which:

DESCRIPTION OF THE PREFERRED EMBODIMENTS

The best mode for carrying out the invention is presented in terms of its preferred embodiment, herein depicted within the Figures.

1. Detailed Description of the Figures

Figure 1:
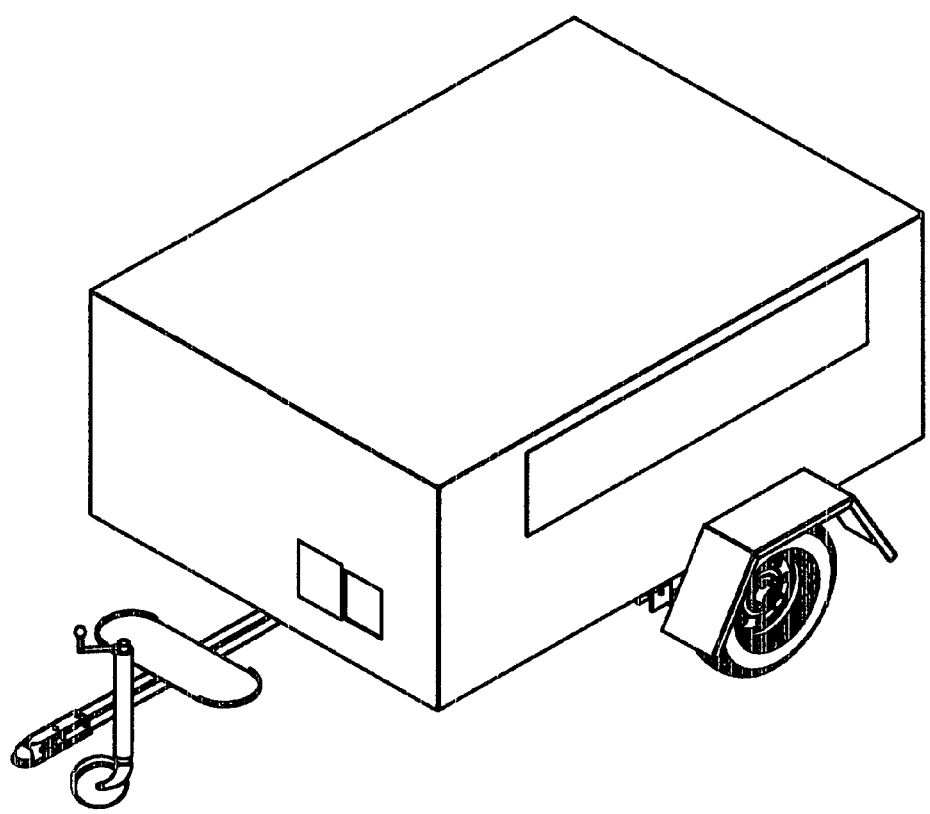
FIG. 1 is a front perspective view of a tailgating trailer 10 embodying the transportable kitchen appliances for tailgate events shown in a stored and portable configuration and according to the preferred embodiment of the present invention.
Figure 2:
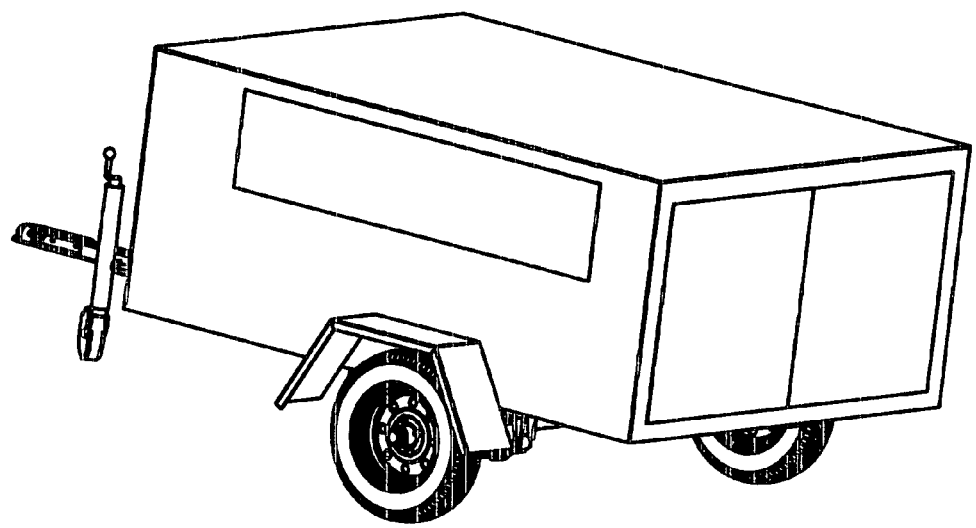
FIG. 2 is a rear perspective view thereof.
Figure 3:
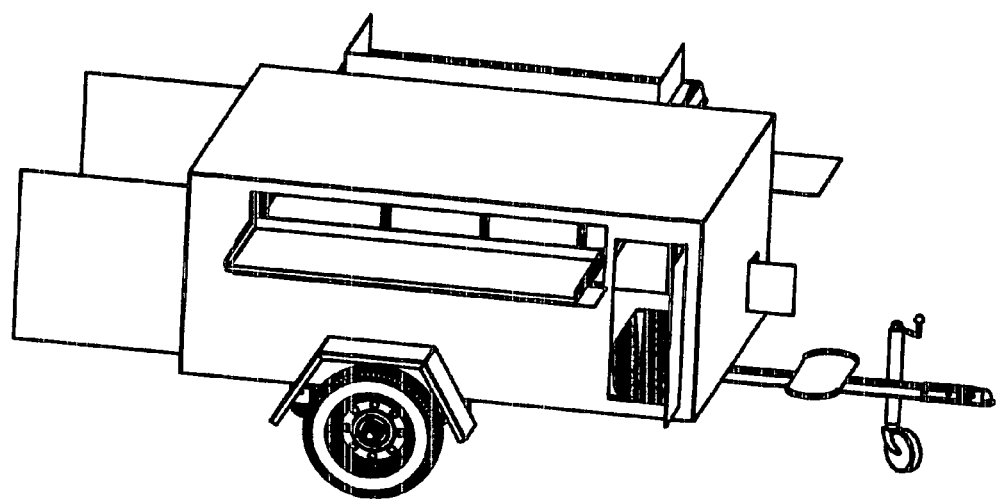
FIG. 3 is a front perspective view of a tailgating trailer 10 embodying the transportable kitchen appliances for tailgate events shown in an extended and deployed configuration and according to the preferred embodiment of the present invention.
Figure 4:
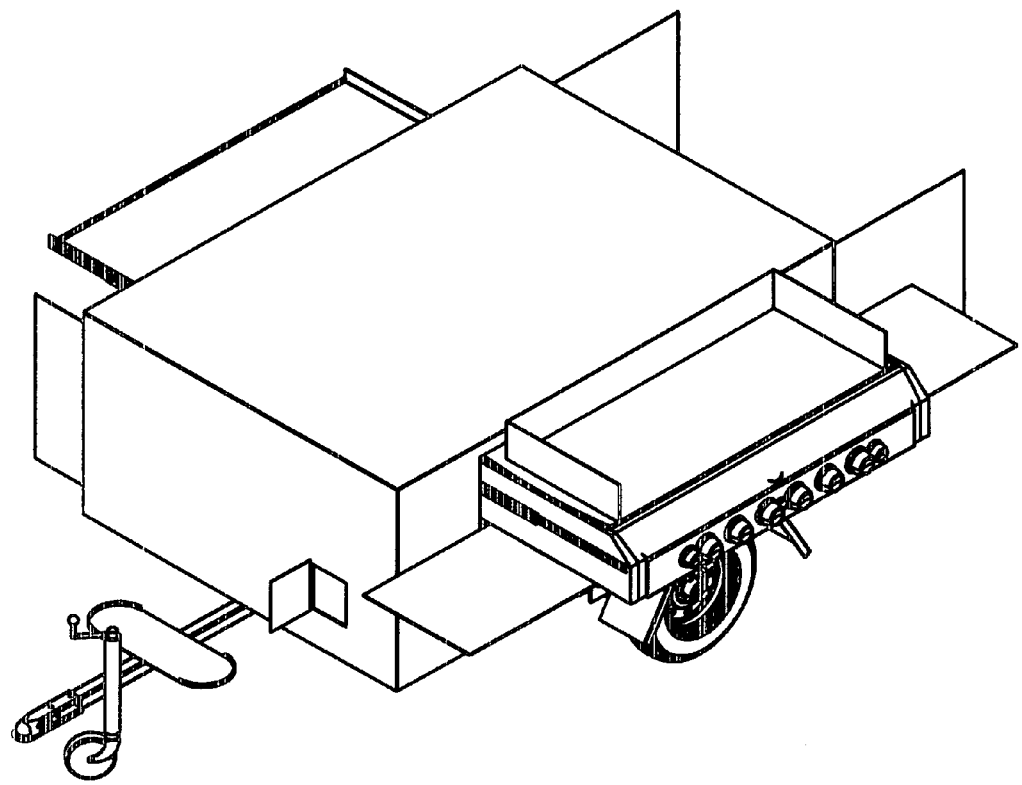
FIG. 4 is a rear perspective view thereof.
Figure 5:
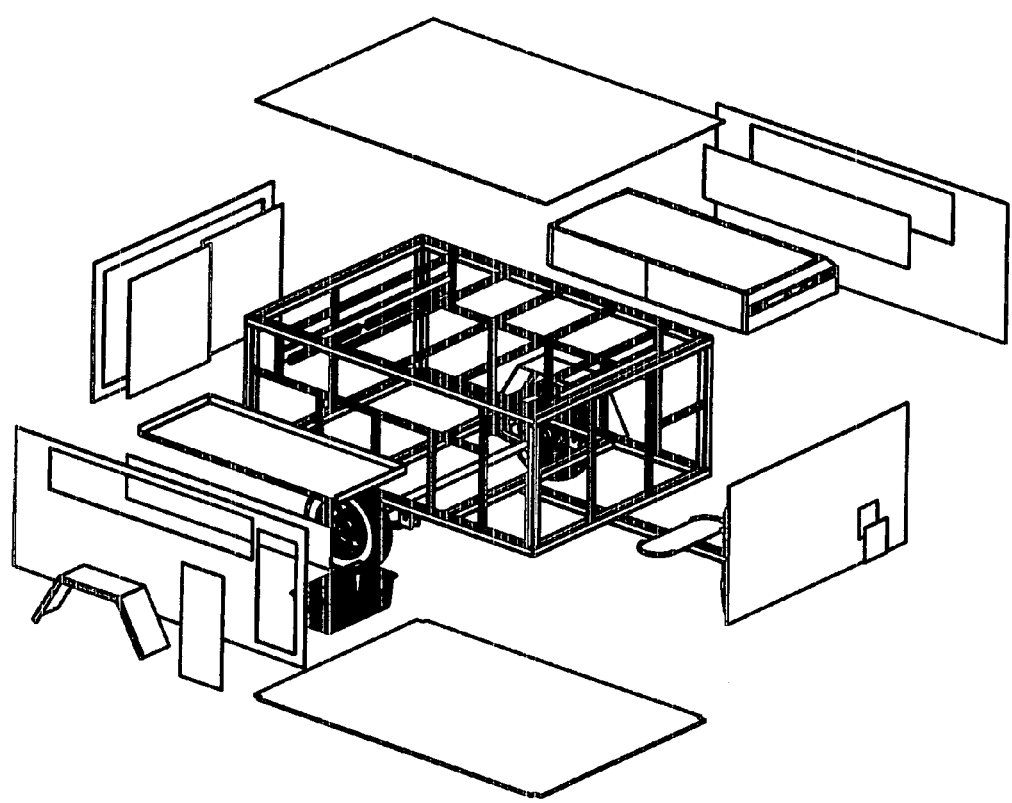
FIG. 5 is an exploded front perspective view thereof.
Figure 6:
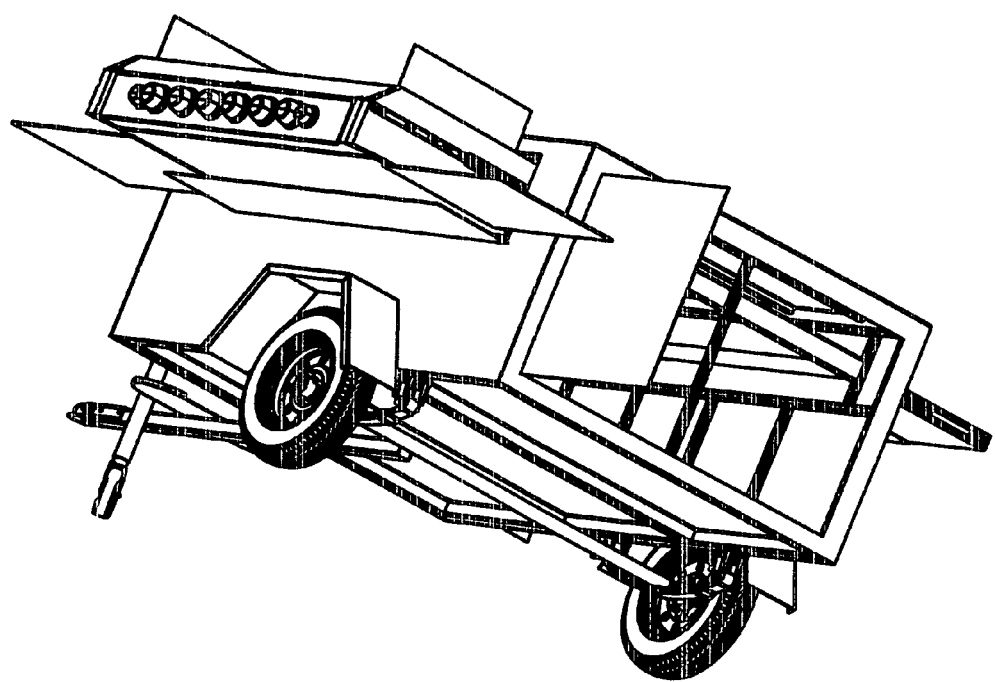
FIG. 6 is a photograph of a left side elevational view thereof.
Figure 7:
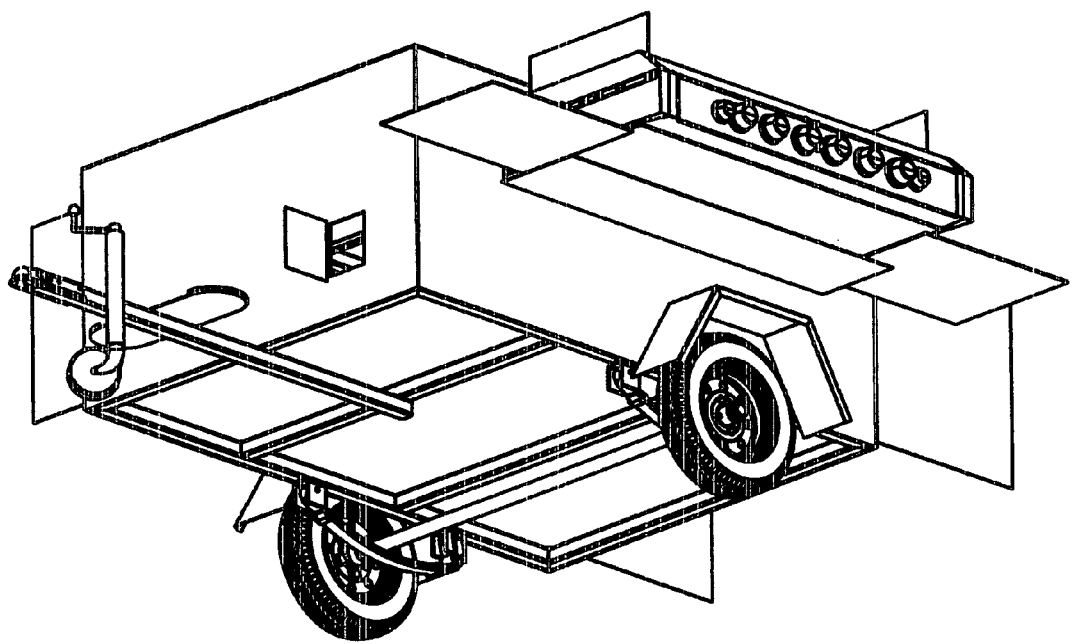
FIG. 7 is a photograph of a left front perspective view thereof.
Figure 8:
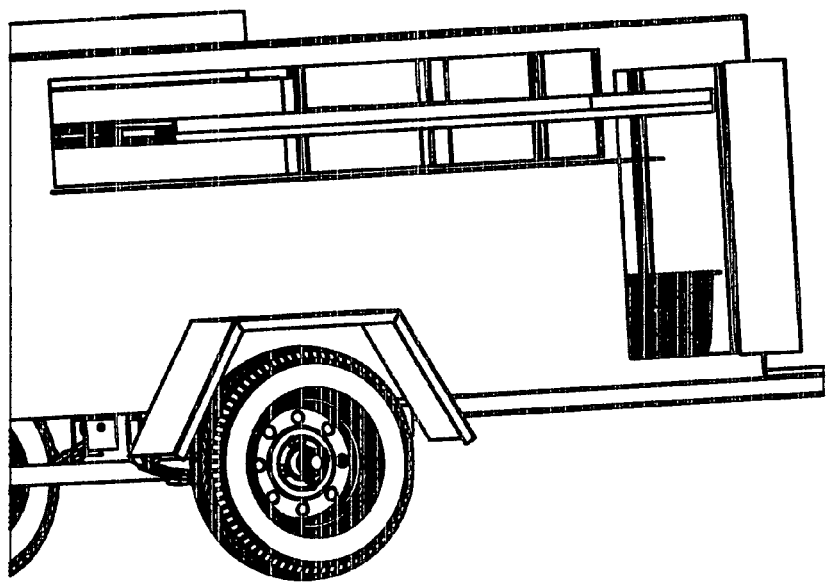
FIG. 8 is a photograph of a right rear perspective view thereof.
Figure 9:
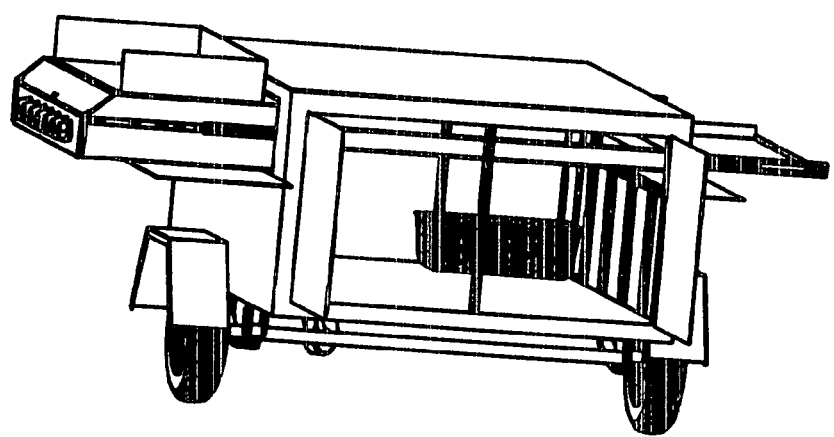
FIG. 9 is a photograph of a rear view thereof.
Figure 10:
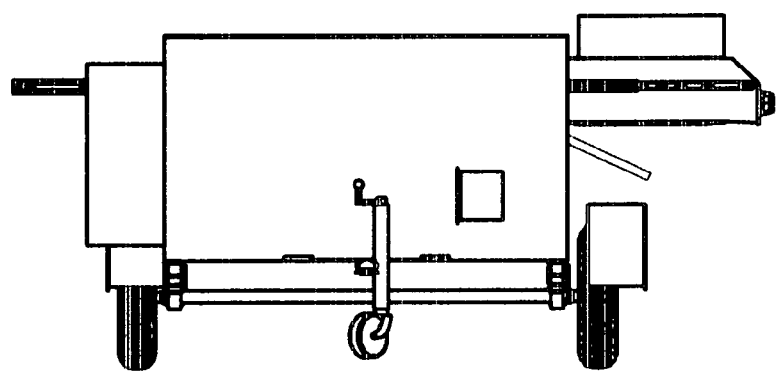
FIG. 10 is a photograph of a detailed view of the event grill 54 and grill door 56 for use therewith.
Figure 11:
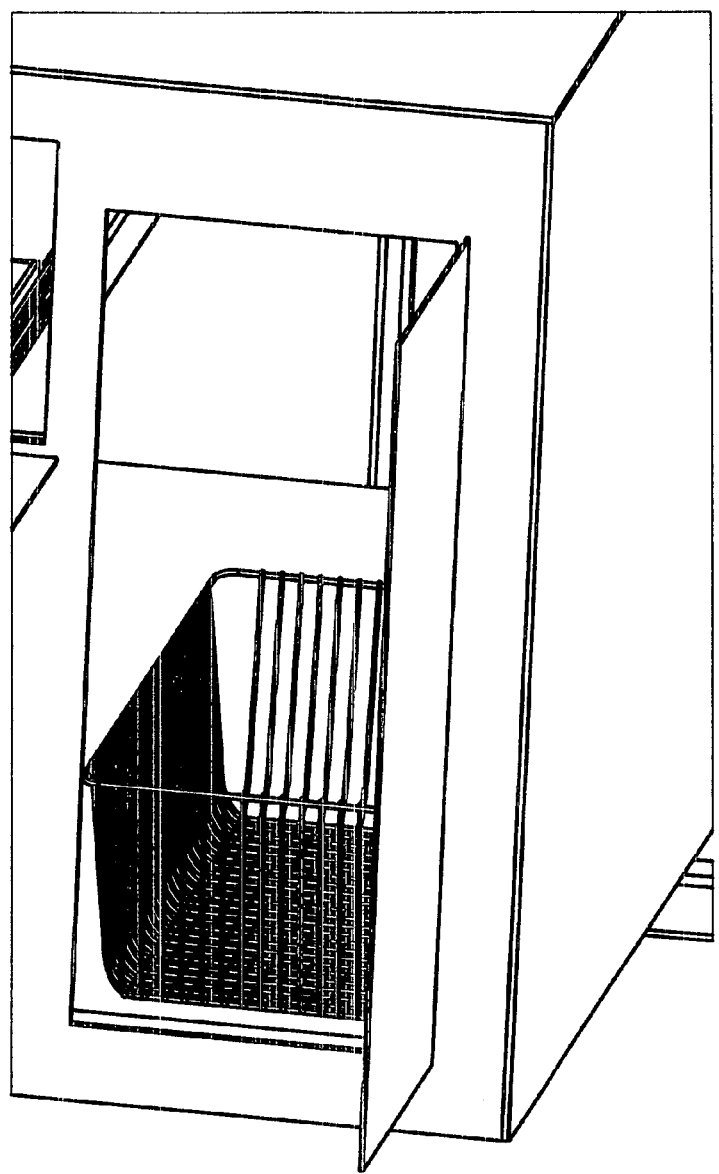
FIG. 11 is a photograph of a detailed view of a side door 70 and roll out bin 72 for use therewith.

The present invention is a transportable kitchen appliances for deployment of cooking facilities in a remote area 10 (hereinafter "tailgating trailer") used to rollably support and to move food preparation and cooking facilities about an outdoor space. In a broad form of the invention with reference to FIG. 1 there is provided a steel framed trailer 12 enclosing an inner volume with a front end 14 opposite a rear end 16, a first side 18 opposite a second side 20, and an upper surface 22 opposite a lower surface 24. The steel framed trailer 12 is supported by an axle 30 and suspension elements upon which a pair of pneumatic wheels 32 are mounted. A towing hitch 34 is secured to the trailer 10 and extends from the front end 14 to form a towing hitch frame and hitch mechanism 35 adapted for articulated connection to a towing motor vehicle (not shown). In its preferred embodiment the wheels 32 are placed slightly behind the horizontal center of gravity of the tailgating trailer 10 so as to allow the trailer 10 to be supported and leveled by an otherwise conventional trailer jack 36 when not in connection with a towing motor vehicle.

It is a particular object of the present invention that, in so far as is possible, weight distribution is concentrated in the area overlying wheels 32 and axle 30, with the overall width, height and length comparable to that of a 4×6 utility trailer provides a 2000 pound gross vehicle weight rating for ease of garaging.

The steel framed trailer 12 is enclosed by gelcoat decorated panels 40a through 40e, with the lower surface 40f enclosed by a standard ½ inch plywood, that are secured by overlapping aluminum polished diamond plate trim 42. An aluminum polished diamond plate stone guard 44 can be also affixed to the front surface, and aluminum polished diamond plate fenders 45 enclosing the wheels 32.

As best shown in conjunction with FIG. 3-9, within the enclosed trailer 10 are a number of storage features, as well as deployable functional elements. While the flat upper panel 40a encloses the equipment when stored, and provides a horizontal support surface when deployed, a 5"×39" prep tray door 50 provides access from which can be deployed a stainless steel, slide out preparation table 52. An event grill 54 is rollably deployed from behind a door 56 on the trailer's first side and, when extended, provides a five foot wide, eight burner grilling surface provided with cooking fuel from pair of LP propane tanks (not shown) mounted to a tank rack 58 positioned for easy accessability and control at the trailer's front end. It is anticipated that in an alternate embodiment, the use of a four burner event grill in fluid communication with a single cooking fuel tank could be provided in an equivalent manner. The rear of the trailer supports a 25"×44" double rear access door 60 to allow for access and egress to the substantial enclosed storage area within, including a roll-out shelf for supporting both a 16 quart cooler and 48 quart cooler of standard design as well as (4) folding canvas chairs and a 30"×72" folding table.

A 15"×24" bin storage door 70 mounted to the trailers second side 40d provides access to a rolling, two tier wire pull drawer 72 for additional food storage adjacent to a 5"×39" prep tray door 50 from which can be deployed a stainless steel, slide out preparation table 52.

A 10-gallon water tank 80 that is internally protected and accessed by an exterior locking water fill and spout.

2. Operation of the Preferred Embodiment

The method of utilizing the present assist device provides storage and transport for a variety of otherwise conventional tailgating equipment, including: a 16 quart cooler; a 48 quart cooler; a 10'×10' pop-up gazebo; (4) folding canvas chairs; and a 30"×72" folding table, all within a transportable, weather resistant enclosure of minimal form factor and volume. The event grill 54 can be deployed and powered by propane for cooking meals prepared on the prep table 52, combine to form a transportable picnic kitchen that is trailer mounted to deploy and retracted within a tow-able trailer for deployment of cooking facilities in a remote area. A pair of jack stands can then be used to balance and position the trailer when removed from the tow vehicle.

Finally, the tailgating and team entertainment trailer of the present invention can be customized in style with high gloss gel coat, aluminum polished diamond plate trim, aluminum polished diamond plate stone guard, and aluminum polished diamond plate fenders.

The foregoing descriptions of specific embodiments of the present invention have been presented for the purposes of illustration and description. They are neither intended to be exhaustive nor to limit the invention to the precise forms disclosed and, obviously, many modifications and variations are possible in light of the above teaching. The embodiments were chosen and described in order to best explain the principles of the invention and its practical application, to thereby enable others skilled in the art to best utilize the invention and the various embodiments with various modifications as are suited to the particular use contemplated. It is intended that the scope of the invention be defined by the Claims appended hereto and their equivalents. Therefore, the scope of the invention is to be limited only by the following claims.

What is claimed is:

1. A transportable kitchen assembly having multiple appliances for deployment of cooking facilities in a remote area, comprising: a reliable support to move food preparation and cooking facilities about an outdoor space, said rollable support having a steel framed trailer enclosing an inner volume and having a front end opposite a rear end, a first side opposite a second side, and an upper surface opposite a lower surface; said steel framed trailer being roadworthy and adapted for supporting at least a 2000 pound gross vehicle weight rating; said steel framed trailer supported by an axle and suspension elements upon which a pair of pneumatic wheels are mounted; a towing hitch secured to said trailer and extending from the front end to form a towing hitch frame and hitch mechanism adapted for articulated connection to a towing motor vehicle; said upper surface enclosing equipment when stored, and providing a horizontal support surface when deployed; an event grill reliably deployed from behind a door on the trailer's first side and, when extended, provides grilling surface in operative connection with a source of cooking fuel; and a roll-out shelf; wherein the rear of the trailer supports a 25"×44" double rear access door to allow for access and egress to the substantial enclosed storage area within, including said roll-out shelf for supporting both a 16 quart cooler and 48 quart cooler of standard design as well as (4) folding canvas chairs and a 30"×72" folding table; wherein said wheels are placed slightly behind the horizontal center of gravity such as to allow the trailer to be supported and leveled by at least one trailer jack; wherein weight distribution is concentrated in the area overlying wheels and axle and with file overall width and length being approximately 4×6, further comprising a 15"×24" bin storage door mounted to provides access to a rolling, two tier wire pull drawer for additional food storage, further comprising a 5"×39" prep tray door from which can be deployed a stainless steel, slide out preparation table, wherein said event grill comprises a five foot wide, eight burner grilling surface, and further comprising a water tank that is internally protected and accessed by an exterior locking water fall and spout.

2. The transportable kitchen appliance of claim 1, wherein said inner volume forms a transportable, weather resistant enclosure adapted for use in combination with the storage and transport of a plurality of otherwise conventional tailgating equipment selected from the group comprising: a 16 quart cooler; a 48 quart cooler; a 10'×10' pop-up gazebo; (4) folding canvas chairs; and a 30"×72" folding table.

3. The transportable kitchen appliance of claim 1, wherein said towing hitch further comprises a standard 1⅞" hitch ball.

* * * * *